(12) United States Patent
Moritani (10) Patent No.: US 7,954,845 B2
(45) Date of Patent: Jun. 7, 2011

(54) KNEE-PROTECTING AIRBAG DEVICE

(75) Inventor: Keisuke Moritani, Settsu (JP)

(73) Assignee: Ashimori Industry Co., Ltd., Osaka (JP)

( * ) Notice: Subject to any disclaimer, the term of this patent is extended or adjusted under 35 U.S.C. 154(b) by 0 days.

(21) Appl. No.: 12/739,112

(22) PCT Filed: Oct. 7, 2008

(86) PCT No.: PCT/JP2008/068243
§ 371 (c)(1),
(2), (4) Date: Apr. 21, 2010

(87) PCT Pub. No.: WO2009/054261
PCT Pub. Date: Apr. 30, 2009

(65) Prior Publication Data
US 2010/0270780 A1     Oct. 28, 2010

(30) Foreign Application Priority Data
Oct. 22, 2007   (JP) ................... 2007-273478

(51) Int. Cl.
*B60R 21/16*     (2006.01)
(52) U.S. Cl. ...................................... 280/730.1
(58) Field of Classification Search ............... 280/730.1, 280/732, 743.1, 743.2, 752, 753
See application file for complete search history.

(56) References Cited

U.S. PATENT DOCUMENTS

| | | | | |
|---|---|---|---|---|
| 6,916,039 B2 * | 7/2005 | Abe | ............................... | 280/729 |
| 7,213,834 B2 * | 5/2007 | Mizuno et al. | ............. | 280/730.1 |
| 7,232,153 B2 * | 6/2007 | Kawauchimaru et al. | . | 280/743.1 |
| 7,384,065 B2 * | 6/2008 | Takimoto et al. | ............. | 280/732 |
| 7,393,011 B2 * | 7/2008 | Keshavaraj | ................. | 280/743.2 |
| 7,600,784 B2 * | 10/2009 | Kashiwagi | .................. | 280/743.2 |
| 7,766,374 B2 * | 8/2010 | Abele et al. | ................. | 280/730.1 |
| 2003/0120409 A1 | 6/2003 | Takimoto et al. | | |
| 2003/0155759 A1 | 8/2003 | Abe | | |
| 2004/0178607 A1 | 9/2004 | Kawauchimaru et al. | | |
| 2006/0108780 A1 * | 5/2006 | Hotta et al. | ................... | 280/732 |

FOREIGN PATENT DOCUMENTS

| | | |
|---|---|---|
| JP | 2003-237525 A | 8/2003 |
| JP | 2004-009992 A | 1/2004 |
| JP | 2005-041462 A | 2/2005 |
| JP | 2005-104269 A | 4/2005 |
| JP | 2005-271703 A | 10/2005 |
| JP | 2006-206049 A | 8/2006 |

* cited by examiner

*Primary Examiner* — Paul N Dickson
*Assistant Examiner* — Robert A Coker
(74) *Attorney, Agent, or Firm* — Sughrue Mion, PLLC (57) ABSTRACT

The inflation and deployment speed of an airbag of a knee-protecting airbag device is increased to quickly deploy the airbag to a position where it can protect the knees of the occupant, thereby improving the occupant protection function. An airbag (10), from a state in which it is arranged in a flat form, is folded sequentially through a first step in which a leading end (10S) is tucked and folded into the airbag (10), a second step in which left and right ends (10M) of the airbag (10) are roll-folded toward each other toward a vehicle-body-side base fabric sheet (12) on the vehicle-body side, and a third step in which the leading end side of the airbag (10) in the deploying direction (F) is roll-folded toward the base end (10T) toward the vehicle-body-side base fabric sheet (12). The folded airbag (10) is accommodated in a case together with an inflator (2), and a base end (10T) thereof is fixed to the case. Thus, an airbag device (1) is produced and is attached to a vehicle, at a position in front of the knees of the occupant.

4 Claims, 4 Drawing Sheets

KNEE-PROTECTING AIRBAG DEVICE

TECHNICAL FIELD

The present invention relates to a knee-protecting airbag device installed in a vehicle, such as a car. The knee-protecting airbag device protects mainly the knees of an occupant in the vehicle using an airbag inflated and deployed by gas from an inflator.

BACKGROUND ART

There is widespread use of cars equipped with airbag devices for protecting occupants in the driver's seat and the passenger seat in a vehicle collision or in an emergency. The airbag devices are installed in, for example, the steering wheel and the instrument panel and have airbags that are inflatable and deployable. Furthermore, in recent years, knee-protecting airbag devices that can protect, at least, the knees of occupants are employed. In order to protect mainly the knees of the occupant, the airbag device is disposed in the vehicle body in front of the occupant, and the inflator is activated in a vehicle collision or in an emergency to inflate and deploy the airbag (a so-called knee bag or knee airbag) mainly between the vehicle body and the knees of the occupant.

This knee-protecting airbag device is disposed in, for example, a lower part of the instrument panel in front of the occupant. From there, in order to protect the occupant, the airbag is inflated and deployed toward a narrow space between the vehicle body and the occupant's legs up to the vicinity of the knees of the occupant before the knees of the occupant come into contact with the vehicle body. Therefore, knee-protecting airbag devices are required to have faster deployment characteristics, for example, the airbags need to deploy up to a height above the knees of the occupant within a short period of time (about 10 ms (milliseconds)) after the airbag starts to inflate and deploy. At the same time, if the airbag exerts a force in directions spreading the knees of the occupant apart during inflation and deployment, the injury to the occupant would be significant, which is dangerous. Therefore, the airbag is also required to deploy evenly on the left and right sides, while preventing the occupant from coming into contact with the airbag deploying in a lateral direction.

In order to meet such a requirement, conventionally, a knee-protecting airbag device is known in which the leading end in the airbag deploying direction is folded into the airbag to increase the deployment speed of the airbag, particularly on the leading end side, making it possible to protect the knees of the occupant and the vicinity thereof more appropriately (see Patent Document 1).

In this conventional knee-protecting airbag device, when the airbag is folded, an upper edge at the time of completion of inflation is folded into the airbag so as to be brought toward a lower edge, and the folded upper edge is then roll-folded so as to be brought toward the lower edge at a wall portion on the vehicle-body side. Then, the left and right ends that are roll-folded are folded back so as to be brought toward the center at a wall portion on the occupant side. By sequentially performing folding-in, roll-folding, and folding-back, the airbag is folded.

However, in this conventional knee-protecting airbag device, the airbag during inflation and deployment deploys only in reverse order to the folding order. That is, the above-described folding back portion, roll-folded portion, and folding-in portion of the upper edge are sequentially unfolded, and deployment is completed through these substantially three stages. Thus, this knee-protecting airbag device has a problem in that the deployment of the entire airbag is slow compared to a device having an airbag that deploys through fewer stages.

Furthermore, in this conventional airbag device, in the airbag in an initial stage of deployment, folded-back portions on both sides first open in the lateral direction and deploy in a direction substantially perpendicular to the upper direction where the knees of the occupant are positioned. Thus, deployment toward a position above the knees of the occupant is slow. As a result, in some cases, for example, in the case where the knees of the occupant are positioned closer to the front of the vehicle than usual and in the case where the moving speed thereof to the front of the vehicle is high, the protection function for protecting occupants may decrease. In addition, in this knee-protecting airbag device, the folding-back portions on both sides in the lateral direction, from where the deployment starts, are formed toward the occupant. Therefore, when the position where the folded airbag is attached to the vehicle body is close to the legs of the occupant, the folding-back portions on both sides, which deploy in the lateral direction, may come into contact with the knees of the occupant or the portions below the knees.

[Patent Document 1] Japanese Unexamined Patent Application, Publication No. 2005-271703

DISCLOSURE OF INVENTION

Problems to be Solved by the Invention

The present invention has been made in view of the above-described conventional problems, and an object thereof is to increase the inflation and deployment speed of an airbag of a knee-protecting airbag device to quickly deploy the airbag to a position where it can protect the knees of the occupant, thereby improving the occupant protection function.

Means for Solving the Problems

A first aspect of the invention is a knee-protecting airbag device including: an airbag with a base end attached to and accommodated in a vehicle body in front of an occupant; and an inflator that supplies gas to the airbag, the knee-protecting airbag device inflating and deploying the airbag from the base end to a position between the vehicle body and the knees of the occupant with the gas from the inflator. The airbag is folded and accommodated so as to have a folding-in portion formed by folding a leading end in the deploying direction into the airbag; a pair of first roll-folded portions formed by roll-folding left and right ends of the airbag, whose leading end has been folded-in, toward each other toward a surface on a vehicle-body side; and a second roll-folded portion formed by roll-folding the leading end of the airbag in the deploying direction, whose left and right ends have been roll-folded, toward the base end toward the surface on the vehicle-body side.

A second aspect of the invention is the knee-protecting airbag device according to the first aspect, in which the pair of first roll-folded portions are formed at a distance from each other so that the left and right ends of the airbag do not come into contact with each other.

A third aspect of the invention is the knee-protecting airbag device according to the first or second aspect, in which the airbag has a tether disposed therein extending in a direction intersecting the deploying direction, the tether defining the inside of the airbag into a plurality of air chambers, and in which the folding-in portion is formed by folding the leading end into the air chamber at the extreme leading end in the deploying direction.

A fourth aspect of the invention is the knee-protecting airbag device according to the third aspect, in which the tether has a gas circulation structure that allows the gas from the inflator to circulate between the air chambers defined on both sides of the tether.

Advantages

According to the present invention, it is possible to increase the inflation and deployment speed of an airbag of a knee-protecting airbag device to quickly deploy the airbag to a position where it can protect the knees of the occupant, thereby improving the occupant protection function.

REFERENCE NUMERALS

1: airbag device, 2: inflator, 2A: gas discharge port, 3: case, 10: airbag, 10B: folding-in portion, 10C: lateral roll-folded portion, 10D: longitudinal roll-folded portion, 10S: leading end, 10T: base end, 11: occupant-side base fabric sheet, 12: vehicle-body-side base fabric sheet, 21: first air chamber, 22: second air chamber, 23: third air chamber, 24: first tether, 24A: gas passages, 24B: through-hole, 25: second tether, 25A: gas passages, 25B: through-hole, 26: third tether, 30: diffuser, 31: opening, 32: accommodating portion, 90: vehicle, 91: steering wheel, 92: shaft, 93: instrument panel, F: airbag deploying direction, S: occupant, K: knee, and L: shin.

BEST MODE FOR CARRYING OUT THE INVENTION

An airbag device according to an embodiment of the present invention will be described below with reference to the drawings.

This airbag device is a knee-protecting airbag device (hereinafter simply, an "airbag device") disposed in front of an occupant in a vehicle, such as an occupant seated in the driver's seat or passenger seat of a car, and can protect the knees of the occupant. Furthermore, this airbag device not only protects the knees, but also restrains the lumbar of the occupant from moving forward to serve to enhance the effect of seat belts. In this embodiment, a description will be given below taking an airbag device disposed in the instrument panel located in front of the driver's seat of a vehicle as an example.

Figure 1:
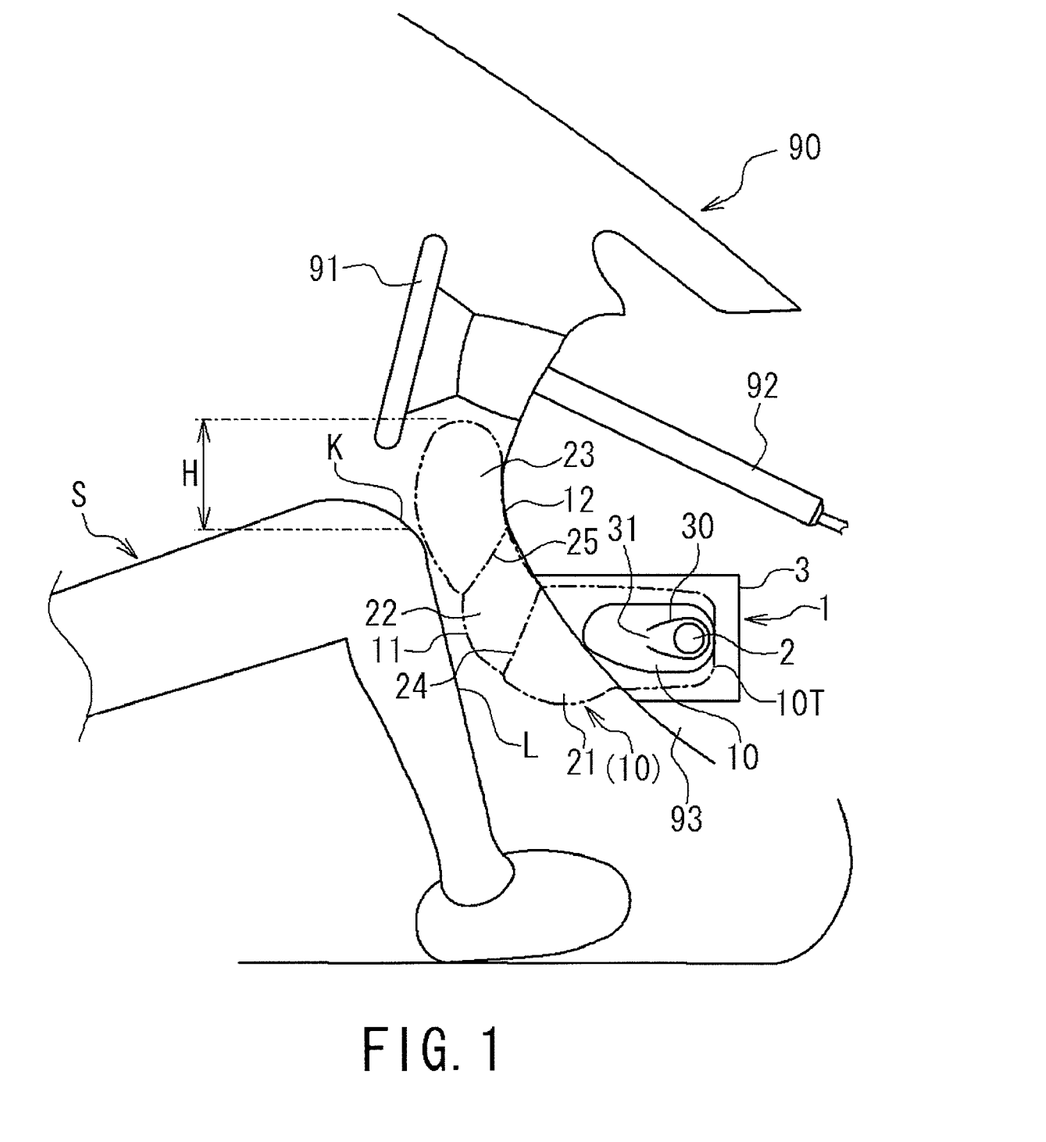
FIG. 1 is a schematic view of a relevant part showing an airbag device according to this embodiment installed in a vehicle.

FIG. 1 is a schematic view of a relevant part showing the airbag device according to this embodiment installed in a vehicle. Mainly, the configuration viewed from a side (in the lateral direction of the vehicle) is schematically shown in cross section. A two-dot chain line in the figure schematically shows a state in which an airbag 10 of an airbag device 1 is inflated and deployed in a vehicle 90. The driver's seat of the vehicle 90 and the vicinity thereof where the airbag device 1 is installed, mainly on a steering wheel 91 side, are also schematically shown partially in cross section, viewed in the lateral direction of the vehicle.

Note that this vehicle 90 is a standard passenger car and, as shown in the figure, includes a steering wheel 91 disposed in front of an occupant S (only the legs are shown), an instrument panel 93 disposed in front of the occupant S so as to cover a shaft 92 connected to the steering wheel 91, and the like. The vehicle 90 also includes the airbag device 1 in the instrument panel 93 positioned below the steering wheel 91, and the airbag device 1 is disposed at a predetermined position on the front side of the occupant S.

The airbag device 1 includes the airbag 10 that is inflatable and deployable, an inflator 2 that generates gas upon detection of a predetermined impact and supplies the gas to the airbag 10, a diffuser 30 that accommodates the inflator 2, and a case 3 that accommodates the airbag 10 before being inflated, the inflator 2, the diffuser 30, etc. Furthermore, this airbag device 1 has a known configuration in which, for example, the case 3 is disposed in the instrument panel 93 on the front side of the vehicle (the right side in the figure) and is attached to a position below knees K of the seated occupant S (herein, a position opposed to shins L), and, in a non-operating state, an opening in the case 3 on the occupant S side is covered by an airbag cover (not shown) that is split by the airbag 10 being inflated and deployed.

The inflator 2 is a cylinder-type gas generating device having a substantially tubular shape (the figure shows a cross section viewed in the lengthwise direction) and generates gas and supplies the gas to the airbag 10 from a gas discharge port (not shown) provided at one end thereof in the lengthwise direction. Furthermore, herein, the inflator 2 is entirely covered by the substantially bag-like diffuser 30 having an opening 31. In this state, the inflator 2 is disposed in the airbag 10 and is fixed in the case 3 through fixing means including bolts, nuts, and attaching members (not shown) so as to sandwich one end (a base end 10T) of the airbag 10 and the diffuser 30, together with them. Thus, the inflator 2 attaches and fixes the base end 10T of the airbag 10 to the case 3 in an airtight manner and, in a vehicle emergency or the like, supplies gas to the airbag 10 from the opening 31 of the diffuser 30 facing toward the inside of the airbag 10.

The case 3 is a container that integrally accommodates the airbag 10 and the inflator 2 in a normal state before the airbag device 1 and the inflator 2 are activated. The case 3 is formed into a substantially box shape from, for example, a metal plate and accommodates the airbag 10 in a predetermined state, i.e., a state of being folded in an inflatable and deployable manner. Furthermore, as described above, the case 3 is fixed in the instrument panel 93 and securely holds the base end 10T of the airbag 10 fixed to the inside by the inflator 2 at the same position even in an activation of the airbag device 1 (in the inflation and deployment of the airbag 10). With this case 3, the airbag 10 before inflation and deployment is accommodated on the vehicle-body side in front of the knees K of the seated occupant S (herein, to the instrument panel 93) with the base end 10T attached.

The airbag 10 has a substantially bag shape having a size corresponding to the area to be protected, for example, the knees K of the occupant S, and has one or a plurality of (herein, two) tethers 24 and 25 provided between the inside surfaces thereof on the occupant S side and the vehicle-body side (instrument panel 93 side). The plurality of tethers 24 and 25 serve as restraining members that restrain the inflation of the airbag 10 in the thickness direction to maintain the distance between the surfaces at a predetermined distance. The tethers 24 and 25 also serve as partition walls that divide (define) the inside of the airbag 10, and they define the inside of the airbag 10 into two or more (herein, three) air chambers 21, 22, and 23 provided on both sides thereof.

In this embodiment, the first tether 24 on the base end 10T side and the second tether 25 on the occupant S side divide the inside of the airbag 10, from the base end 10T side to the other end side (leading end side), into a first air chamber 21 and a second air chamber 22 that mainly receive the shins L side of the occupant S and a third air chamber 23 that mainly receives the knees K of the occupant S. Furthermore, during inflation and deployment, the airbag 10 deploys from the base end 10T side toward the space between the instrument panel 93 and the knees K of the occupant S, while sequentially inflating the air chambers 21, 22, and 23 (in the present invention, the direction in which the airbag 10 deploys is referred to as a "deploying direction").

This airbag 10 is formed in a substantially bag shape by, for example, layering two base fabric sheets of the same shape, formed by cutting woven fabric, on top of each other, or, by folding a base fabric sheet having a symmetrical shape and then sewing them together along the peripheral portion, that is, by joining opposed base fabric sheets at a predetermined position in an airtight manner so as to form inflatable air chambers therebetween. In this embodiment, the airbag 10 is formed of an occupant-side base fabric sheet 11 on the occupant S side and a vehicle-body-side base fabric sheet 12 on the instrument panel 93 side having the same shape. The opposed base fabric sheets 11 and 12 are laid on top of each other and sewn together along the outer peripheral edges to form the airbag 10.

Figure 2:
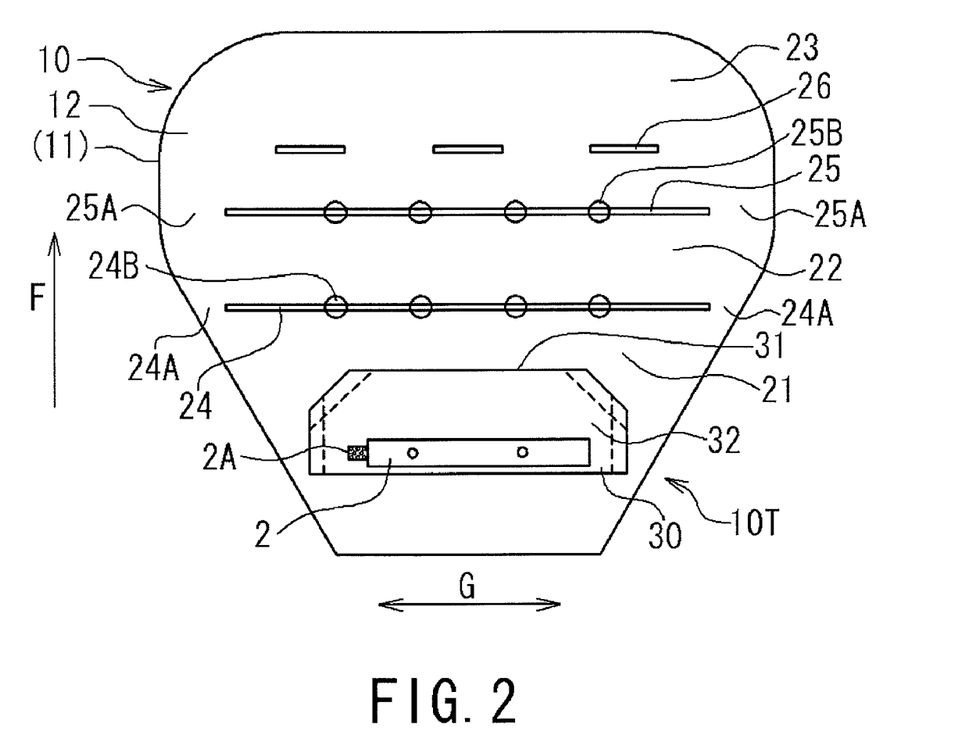
FIG. 2 is a plan view schematically showing an airbag according to this embodiment.

FIG. 2 is a plan view schematically showing the thus-formed airbag 10 and is a deployed plan view showing, in outline, the shape and configuration of the airbag 10 in a deployed state, viewed from the vehicle body (instrument panel 93) side. The figure also shows the inner configuration of the airbag 10 in a see-through view showing the inside.

As shown in the figure, the airbag 10 is formed such that the width of the vehicle-body-side base fabric sheet 12 and the occupant-side base fabric sheet 11 (positioned on the far side with respect to the plane of the sheet) opposed to each other is large on the leading end side in the deploying direction (arrow F in the figure) and is gradually reduced toward the base end 10T, and such that both sides in the left-right direction (arrow G in the figure), substantially perpendicular to the deploying direction F, are substantially symmetrical with respect to the center line of the airbag 10.

In the airbag 10, the above-described two tethers 24 and 25 are disposed so as to extend in a direction intersecting the deploying direction F and are joined to the opposed surfaces of the base fabric sheets 11 and 12 by sewing over substantially the entirety thereof in the lengthwise direction. Thus, the tethers 24 and 25 function as the partition walls having a predetermined length in the front-rear direction of the vehicle in the airbag 10 and divide the inside of the airbag 10 in the deploying direction F to form three air chambers 21, 22, and 23. Furthermore, herein, the tethers 24 and 25 have a ribbon shape of a predetermined width and extend substantially in parallel to each other in the left-right direction G perpendicular to the deploying direction F. The ends of the tethers 24 and 25 in the lengthwise direction are not joined to the base fabric sheets 11 and 12 at both ends of the airbag 10 in the left-right direction G, so as to provide gas passages (spaces) 24A and 25A therebetween.

In addition, the tethers 24 and 25 have a gas circulation (flow-in) structure that allows the adjacent air chambers 21, 22, and 23 to communicate with one another, which is formed by, for example, providing one or a plurality of through-holes from the central portion and the vicinity thereof to both edges in the left-right direction G or by forming the tethers 24 and 25 from a plurality of segments arranged to leave gaps or notches therebetween. This gas circulation structure constitutes a gas-flowable portion that allows the gas from the inflator 2 to circulate (flow-in) through the air chambers 21, 22, and 23 defined by the tethers 24 and 25 and formed on both sides thereof. Herein, the gas circulation structure is formed of a plurality of through-holes 24B and 25B. That is, the tethers 24 and 25 each have a plurality of (herein, four) through-holes 24B and 25B (schematically shown as circular holes in the figure) that are provided substantially symmetrical on the left and right sides with respect to the center line of the airbag 10, substantially evenly at equal intervals in the left-right direction G. The gas is circulated through these through-holes 24B and 25B.

On the other hand, the air chambers 21, 22, and 23 in the airbag 10 are defined by the tethers 24 and 25 and extend in the left-right direction G perpendicular to the deploying direction F of the airbag 10. When inflated, the air chambers 21, 22, and 23 have substantially tubular shapes whose thicknesses and widths correspond to the widths, disposing distances, etc., of the tethers 24 and 25. Furthermore, the adjacent ones of the air chambers 21, 22, and 23 with the tethers 24 and 25 therebetween communicate with each other through the gas passages 24A and 25A at both ends and the through-holes 24B and 25B, and they are inflated and deployed by the gas supplied and circulated therethrough.

Moreover, in the third air chamber 23 on the leading end side in the deploying direction F, a plurality of (herein, three) third tethers 26 are joined to predetermined positions of the opposed base fabric sheets 11 and 12 by sewing or the like. These third tethers 26 are, for example, substantially rectangular or strip-shaped base fabric sheets for restraining the inflation of the third air chamber 23 in the thickness direction, and they are arranged at predetermined positions in the third air chamber 23 in the deploying direction F (herein, positions close to the second tether 25 located at substantially the center) at substantially equal intervals in the left-right direction G. On the other hand, in the first air chamber 21 on the base end 10T side, the inflator 2 covered by the above-described diffuser 30 is disposed in such a manner that the lengthwise direction thereof is substantially perpendicular to the deploying direction F of the airbag 10.

Herein, the diffuser 30 serves as a rectifying member that rectifies the gas from the inflator 2 and supplies the gas to the airbag 10, as well as a protection member (protection cloth) that protects the airbag 10 from the gas generated from the inflator 2 and the gas discharge port 2A at one end thereof. That is, the diffuser 30 with the inflator 2 accommodated in an internal accommodating portion 32 is disposed on the base end 10T side of the airbag 10, mainly between the inflator 2 and the base fabric sheets 11 and 12. Thus, the diffuser 30 prevents the gas generated by the inflator 2 from directly blowing against the base fabric sheets 11 and 12, the first tether 24, and the like and prevents the gas discharge port 2A from coming into direct contact with the airbag 10 to protect the airbag 10 and reduce the damages thereto.

Furthermore, herein, the diffuser 30 is formed in a bag shape by folding one base fabric sheet into half and joining it along its edge such that a part thereof is open. Then, the diffuser 30 is disposed such that the opening 31 thereof is oriented in the deploying direction F (upper side in the figure) in the airbag 10. Moreover, the left and right sides of the diffuser 30 on the opening 31 side are joined so as to be inclined toward each other such that the substantially bag-like accommodating portion 32 is gradually reduced in size toward the opening 31, and the opening 31 is disposed so as to face the central portion of the first tether 24. In contrast, the inflator 2 is disposed such that the entirety thereof is accommodated in the diffuser 30 and such that the gas discharge port 2A thereof is disposed in a region in the above-described inclined joined portion being located at one end of the diffuser 30 (the left side in the figure) and outside of the opening 31 in the left-right direction G.

In the airbag device 1, the inflator 2 is disposed in the first air chamber 21, and, in a vehicle emergency or the like, gas generated from the gas discharge port 2A is supplied into the first air chamber 21 through the opening 31 of the diffuser 30. The gas is allowed to circulate through the gas passages 24A and 25A and the through-holes 24B and 25B toward the second air chamber 22 and the third air chamber 23 to inflate these air chambers and to deploy the airbag 10 in the deploying direction F. Thus, the airbag device 1 (see FIG. 1) deploys the airbag 10 from the base end 10T attached in front of the occupant S upward in the vehicle height direction along the instrument panel 93 and inflates and deploys the airbag 10 between the vehicle body and at least the knees K of the occupant S (herein, from the shins L to above the knees K). In this manner, the airbag 10 is inflated and deployed mainly between the vehicle body and the knees K of the occupant S to protect at least the knees K of the occupant S with this airbag 10. Thus, mainly the knees of the occupant S seated in the vehicle are protected.

Herein, although a non-coated base fabric sheet, which is not coated, may be used for the base fabric sheets 11 and 12, and the like that constitute the airbag 10, a base fabric sheet having an airtight resin layer made of, for example, silicone rubber or silicone resin may be used, from the standpoint of airtightness. Furthermore, in this airbag device 1, the deploying length of the airbag 10 is set such that the third air chamber 23 provided at the extreme leading end of the airbag 10 in the deploying direction F comes into contact with the vicinity of the knees K of the occupant S, and such that the leading end of the airbag 10 can cover up to the region 50 mm above the height of the knees of the occupant S (see area H in FIG. 1). Moreover, herein, in order to increase the speed at which the airbag 10 is inflated and deployed to quickly deploy the airbag 10 to a predetermined height above the knees of the occupant S, the airbag 10 is folded according to a predetermined process, for example, the leading end of the airbag 10 is folded into the airbag 10, and is accommodated in the case 3.

FIG. 3 is a schematic view sequentially showing the steps of folding the airbag 10. FIG. 3 contains plan views corresponding to the above-described FIG. 2 and schematically showing various states of the airbag 10 viewed from the vehicle body (instrument panel 93) side. Note that FIG. 3D schematically shows a cross section taken along line X-X in FIG. 3C.

In this embodiment, as shown in the figure, the inflator 2 accommodated in the above-described diffuser 30 (not shown in FIG. 3) is preliminarily disposed at a predetermined position in the airbag 10, and the airbag 10 is folded. Then, they are integrally accommodated in the case 3. At this time, the airbag 10 is folded through folding steps (process) mainly consisting of a first step in which a leading end 10S in the deploying direction F is folded; a second step in which ends (left and right ends) 10M in the left-right direction G perpendicular to the deploying direction F of the airbag 10 after the first step are roll-folded in the lateral direction; and a third step in which the airbag 10 after the second step is roll-folded in the longitudinal direction toward the base end 10T.

Figure 3A:
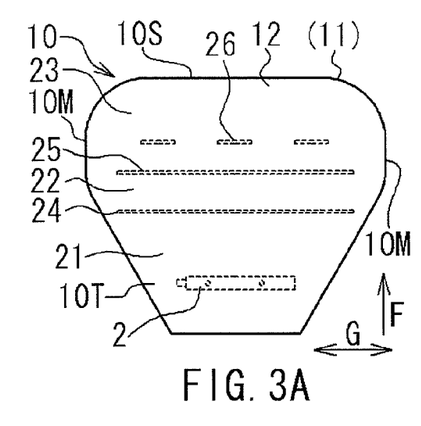
FIG. 3 is a schematic view sequentially showing the steps of folding the airbag according to this embodiment.
Figure 3B:
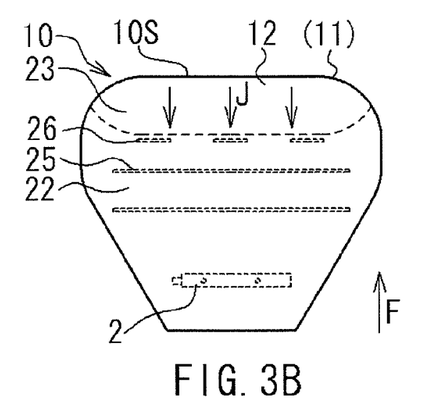
Figure 3C:
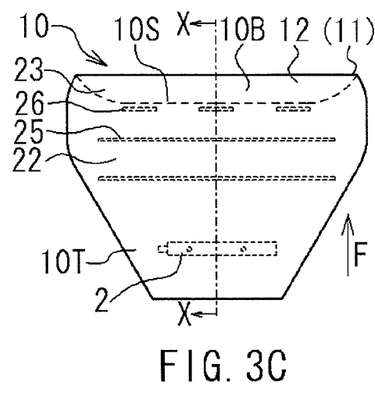

More specifically, in the first step, from a state in which the base fabric sheets 11 and 12 of the airbag 10 are laid flat on top of each other (see FIG. 3A), the leading end 10S in the deploying direction F during inflation and deployment is folded so as to be tucked into the airbag 10 (arrows J in FIG. 3B). At this time, the surface of the airbag 10 at the leading end 10S (see FIG. 3C) is tucked into the airbag 10 from the upper edge toward the base end 10T of the airbag 10 so as to be reversed to the inside. Thus, the base fabric sheets 11 and 12 are folded (see FIG. 3D) to form a folding-in portion 10B.

Furthermore, in the first step, the leading end 10S of the airbag 10 is folded into the air chamber at the extreme leading end in the deploying direction F (herein, the third air chamber 23), and folding-in of the leading end 10S is performed only in the third air chamber 23. At the same time, herein, the leading end 10S of the airbag 10 is folded to the position of the plurality of third tethers 26 in the third air chamber 23 so as to be abutted thereagainst.

Figure 3D:
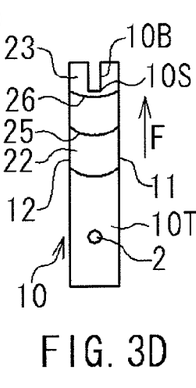

Although FIG. 3D schematically shows a folded state of the leading end 10S such that gaps are provided between the members, such as the base fabric sheets 11 and 12, these members are actually disposed so as to overlie each other. Furthermore, the third tethers 26 are pushed toward the second tether 25 by the leading end 10S and are folded and layered at the substantially central position. In addition, herein, although the leading end 10S of the airbag 10 is folded to the position of the third tethers 26, if no such tethers are provided in the third air chamber 23, the leading end 10S is folded to the position of, for example, the second tether 25 that defines the third air chamber 23 so as to be abutted thereagainst.

Next, in the second step, the left and right ends 10M of the airbag 10 (see FIG. 3E) after the first step are folded toward each other so as to be wrapped around the surface on the vehicle-body side, thereby roll-folding the respective predetermined areas in the lateral direction. At this time, in the second step, the left and right ends 10M of the airbag 10 are roll-folded with the vehicle-body-side base fabric sheet 12 inside, from the outside toward the center of the airbag 10 in the left-right direction G, by folding and sequentially rolling them toward the vehicle-body-side base fabric sheet 12 on the instrument panel 93 side a predetermined number of times (arrows R1 and R2 in FIG. 3E).

Thus, the left and right ends 10M of the airbag 10 are roll-folded to the length of the inflator 2 and the width of the above-described accommodating portion of the case 3, forming lateral roll-folded portions 10C having a predetermined width on both sides of the airbag 10 in the lateral direction (see FIG. 3F) and making a folding width W in the left-right direction G substantially the same as the length of the inflator 2. Furthermore, herein, the left and right ends 10M roll-folded in the second step are disposed with a predetermined distance therebetween so that the opposed portions at the center of the airbag 10 do not come into contact with each other, that is, the airbag 10 has a non-roll-folded portion between the lateral roll-folded portions 10C.

Next, in the third step, the leading end of the airbag 10 in the deploying direction F after the second step is folded toward the base end 10T so as to be wrapped around the surface on the vehicle-body side, thereby roll-folding a predetermined area in the longitudinal direction. At this time, in the third step, the airbag 10 after the lateral roll-folded portions 10C are formed is folded and sequentially rolled toward the vehicle-body-side base fabric sheet 12 a predetermined number of times, from the leading end side in the deploying direction F toward the base end 10T and the inflator 2 (arrows R3 to R7 in FIG. 3F). Thus, the airbag 10 is roll-folded to a predetermined width with the lateral roll-folded portions 10C and the vehicle-body-side base fabric sheet 12 inside, forming a longitudinal roll-folded portion (second roll-folded portion) 10D next to a portion where the inflator 2 is disposed (see FIG. 3G).

The airbag 10 folded through the above-described process is then accommodated in the case 3 (see FIG. 1) together with the inflator 2 and the like. Then, as described above, the base end 10T is fixed to the case 3. Thus, the airbag device 1 is manufactured. Thereafter, the airbag device 1 is installed in the instrument panel 93 of a vehicle and, in a vehicle emergency or the like, activates the inflator 2 and supplies gas to the airbag 10 sequentially through the through-holes 24B and 25B in the tethers 24 and 25 and the gas passages 24A and 25A on both sides. Thus, the airbag 10 is inflated and deployed from the base end 10T, at which it is attached to the vehicle-body, toward the leading end 10S and in the left-right direction G etc., while eliminating the folded shape.

FIG. 4 is a schematic view sequentially showing the respective states in which the airbag 10 of the airbag device 1 is inflated and deployed. FIG. 4 shows the airbag device 1 and the knees K of the occupant S and the vicinity thereof, extracted from FIG. 1.

Figure 4A:
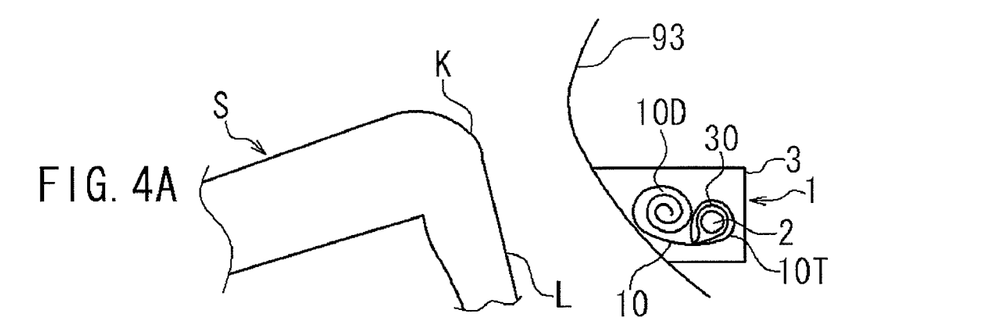
FIG. 4 is a schematic view sequentially showing the respective states in which the airbag of the airbag device according to this embodiment is inflated and deployed.

As shown in FIG. 4A, the airbag 10 before inflation and deployment is disposed in the case 3 together with the inflator 2 etc., with the longitudinal roll-folded portion 10D formed in the above-described third step oriented upward and is accommodated on the vehicle-body side in a state of being roll-folded toward the vehicle body (instrument panel 93) side with respect to the occupant S side. From this state, during inflation and deployment, the airbag 10 begins to deploy from the base end 10T on the vehicle-body side because of the gas supplied through the opening 31 of the diffuser 30 and projects from the inside of the case 3 and instrument panel 93 toward the occupant S on the rear side of the vehicle.

Figure 3F:
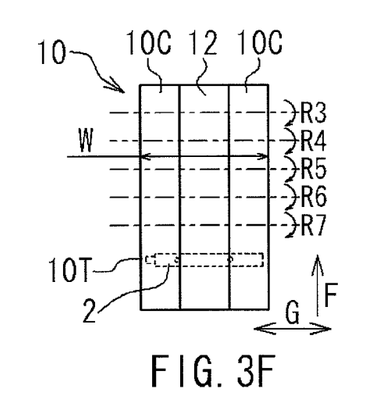
Figure 3G:
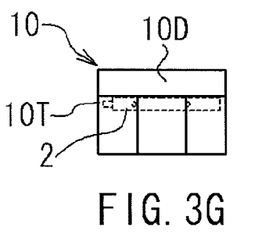
Figure 4B:
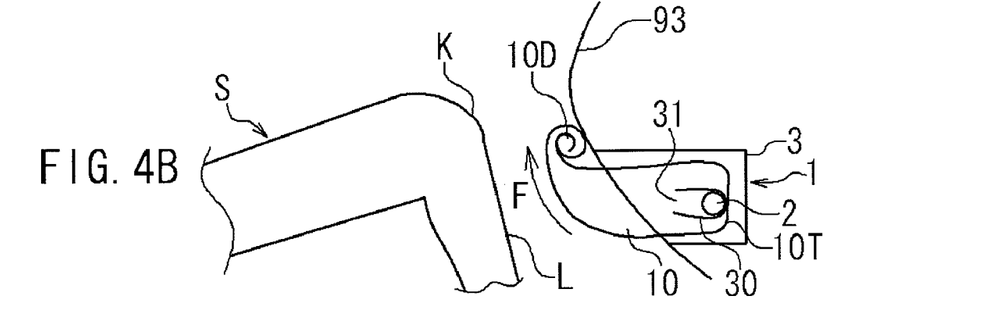
Figure 4C:
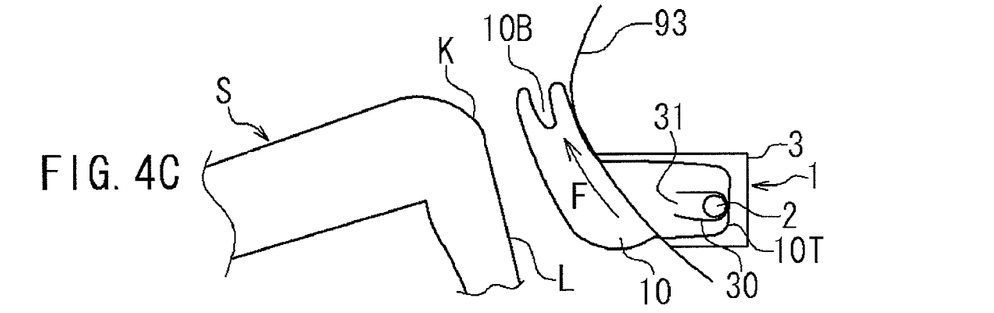
Figure 4D:
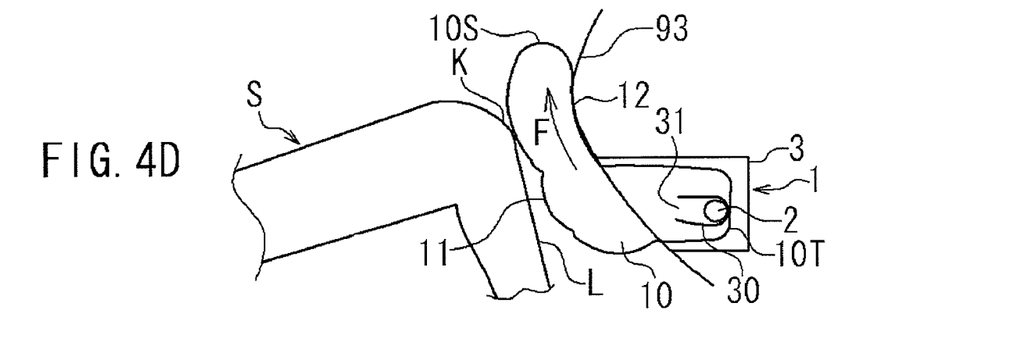

During inflation and deployment, as shown in FIG. 4B, first, the longitudinal roll-folded portion 10D formed in the third step (see FIGS. 3F and 3G) is unfolded in a direction opposite to the rolled direction and the airbag 10 sequentially deploys mainly in the vehicle height direction. At this time, because the airbag 10 of the airbag device 1 is roll-folded toward the instrument panel 93, it deploys closely along the outer surface of the instrument panel 93 on the occupant S side, toward the knees K of the occupant S. In this manner, the airbag 10 in an initial stage of the inflation and deployment first deploys in the vehicle height direction, extends mainly in the same direction (see FIG. 4C) until the longitudinal roll-folded portion 10D is unfolded along the instrument panel 93, and deploys to about the height of the knees K of the occupant S.

Next, the lateral roll-folded portions 10C of the airbag 10 (see FIGS. 3E and 3F) formed in the second step are unfolded in the directions opposite to the rolled directions and deploy mainly outward of the airbag 10 in the left-right direction G. At this time, because the lateral roll-folded portions 10C to be deployed are roll-folded toward the instrument panel 93, similarly to the above-described longitudinal roll-folded portion 10D, they extend toward both left and right ends and deploy along the outer surface of the instrument panel 93, on a side of the airbag 10 opposite to the occupant S.

Note that the lateral roll-folded portions 10C start deploying at different timings according to the folded state of the airbag 10 and the roll-folding conditions, such as the number and extent of roll-foldings. For example, the lateral roll-folded portions 10C may start deploying upon completion of the deployment of the longitudinal roll-folded portion 10D or may sequentially deploy from a portion where the longitudinal roll-folded portion 10D has been deployed, along with the deployment thereof. However, the lateral roll-folded portions 10C start deploying after the deployment of the longitudinal roll-folded portion 10D and deploy in the left-right direction G, i.e., the vehicle width direction, after the deployment of the airbag 10 is temporarily directed in the vehicle height direction. Thus, in this airbag 10, the longitudinal roll-folded portion 10D is unfolded and deployed prior to the lateral roll-folded portions 10C, whereby the deployment speed in the vehicle height direction (the above-described deploying direction F) is increased, and the airbag 10 quickly inflates and deploys to the vicinity of the knees K of the occupant S.

Furthermore, in the airbag 10, with the deployment of the lateral roll-folded portions 10C, the folding-in portion 10B formed in the first step (see FIGS. 3B and 3C) is released from the restraint by the lateral roll-folded portions 10C, and an area thereof positioned in a region inflated by the gas gradually increases. As a result, the folding-in portion 10B inside the airbag 10 (see FIG. 4C) receives the gas pressure and begins to deploy. Then, it gradually extends outside the airbag 10 in conjunction with the deployment of the lateral roll-folded portions 10C (see FIG. 4D) and completes the deployment substantially simultaneously with the completion of the deployment of the lateral roll-folded portions 10C. Accordingly, after the completion of the deployment of the longitudinal roll-folded portion 10D, the airbag 10 deploys to its leading end 10S at a high speed, and the entirety deploys substantially in two stages including left-right direction G, and the inflation and deployment are quickly completed.

In the above-described manner, the airbag 10 inflates and deploys to a predetermined height above the knees from the base end 10T side to a position between the instrument panel 93 and the knees K of the occupant S, and mainly the knees K of the occupant S moving toward the front side of the vehicle come into contact with the occupant-side base fabric sheet 11. As a result, the opposite side of the airbag 10, i.e., the vehicle-body-side base fabric sheet 12, is pressed against the outer surface of the instrument panel 93, and, as described above, the air chambers 21, 22, and 23 in the airbag 10 (see FIG. 1) receive the knees K of the occupant S and the like. Thus, mainly the knees K of the occupant S are protected.

In the airbag device 1 according to this embodiment, during inflation and deployment, the deployment speed of the airbag 10 is high. Thus, the airbag 10 is rapidly deployed toward a small space between the vehicle body and the occupant S, whereby the inflation and deployment of the airbag 10 can be quickly completed. This enables the airbag 10 to be reliably deployed to a height above the knees before the knees K of the occupant S come into contact with the vehicle body. Thus, the deployment characteristics of the airbag 10 can be increased to reliably protect the knees K of the occupant S.

Furthermore, the airbag 10 quickly deploys along the instrument panel 93 because of the direction in which it is roll-folded, and the deployment toward the occupant S (knees K) is small. Thus, it is possible to minimize the impact load applied to the knees K of the occupant S, reducing the direct damage to the knees K. At the same time, even when the distance between the knees K of the occupant S and the instrument panel 93 is narrow or when the speed at which the occupant S moves toward the front of the vehicle is high, the airbag 10 can be properly inflated and deployed without interfering with the knees K. Thus, because the airbag 10 quickly and reliably deploys to a position above the knees, the danger of the knees K of the occupant S coming into contact with the instrument panel 93 opposed thereto can be reduced. Thus, the protection function of the airbag 10 to protect the occupant S (knees K) can be effectively improved.

Furthermore, as described above, although the folding process of the airbag 10 includes three stages, the airbag 10 deploys substantially in two stages during inflation and deployment. Thus, the inflation and deployment of the entire airbag 10 can be completed within a short period of time. Moreover, herein, the lateral roll-folded portions 10C (see FIGS. 3E and 3F) formed in the second step also deploy in the lateral direction along the outer surface of the instrument panel 93. Thus, the lateral roll-folded portions 10C during deployment are less likely to come into contact with the occupant S, whereby the deployment can be performed reliably and substantially left-right symmetrically (evenly). As a result, the knees K of the occupant S can be prevented from coming into contact with the airbag 10 and being spread apart during inflation and deployment, that is, a force acting in the directions spreading the knees K apart can be reduced. Thus, the injury to the occupant S can be minimized.

Accordingly, with this embodiment, the inflation and deployment speed of the airbag 10 of the airbag device 1 can be increased to quickly deploy the airbag 10 to a position where it can protect the knees K of the occupant S. Thus, the protection function to protect the occupant S can be improved. In addition, in this airbag 10, because the folding-in portion 10B at the leading end 10S is positioned inside the airbag 10, the folding-in portion 10B can be reliably deployed without being affected by the friction with the knees K or the instrument panel 93. Thus, the airbag 10 can be sufficiently deployed in the vehicle height direction and can reliably protect the occupant S even in a narrow space. Furthermore, even if the folding-in portion 10B is sandwiched between the occupant S and the instrument panel 93, it passes therebetween and deploys. Thus, the airbag 10 can be reliably deployed to the leading end 10S. Moreover, when the deployment of the longitudinal roll-folded portion 10D, which deploys first, is completed (see FIG. 4C), the folding-in portion 10B tends to project from the inside of the airbag 10 in the deploying direction F due to the centrifugal force during deployment. Thus, the folded airbag 10 can be more quickly deployed.

Figure 3E:
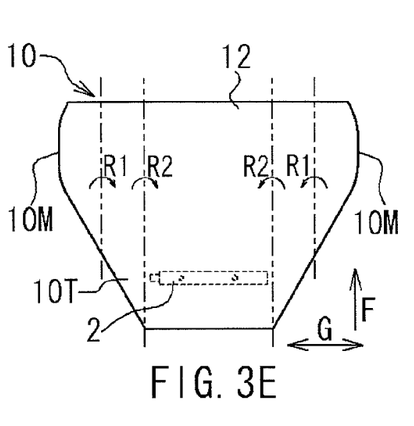

Herein, in this embodiment, the lateral roll-folded portions 10C are formed at a distance from each other in the second step in the folding process (see FIGS. 3E and 3F). This enables the gas from the inflator 2 to directly act on the folding-in portion 10B at the leading end 10S through the lateral roll-folded portions 10C on both sides, after the deployment of the longitudinal roll-folded portion 10D is completed. Accordingly, the deployment of the folding-in portion 10B can be started at an earlier stage, increasing the deployment speed of the leading end 10S of the airbag 10 and the entirety of the airbag 10. Thus, the deployment can be more quickly completed.

Furthermore, in this airbag device 1, the tethers 24 and 25 having the through-holes 24B and 25B that allow the above-described gas to circulate and a plurality of third tethers 26 are provided in the airbag 10. Thus, it is possible to restrain the inflation of the airbag 10 and to prevent large inflation and deployment toward the occupant S side. At the same time, the gas from the inflator 2, while deploying the longitudinal roll-folded portion 10D, passes through the through-holes 24B and 25B in the tethers 24 and 25 and reaches the leading end 10S of the airbag 10, inflating the air chambers 21, 22, and 23 and acting on the folding-in portion 10B at the leading end. As a result, the folding-in portion 10B can be more reliably and quickly deployed, and the deployment thereof is completed substantially simultaneously with the completion of the deployment of the lateral roll-folded portions 10C. Thus, the entirety of the airbag 10 can be more quickly deployed.

Moreover, herein, the leading end 10S is folded into the third air chamber 23 at the extreme leading end in the deploying direction F (see FIGS. 3B and 3C) when the airbag 10 is folded. In addition, the leading end 10S can be folded into the third air chamber 23 so as to be abutted against the plurality of third tethers 26. That is, the folding-in operation is easy, and the operation efficiency can be increased. At the same time, because the third tethers 26 serve as the guide of the length to which the leading end 10S of the airbag 10 is folded, the leading end 10S can be uniformly folded, reducing variations in operation. Thus, it is also possible to make the folded shape of the respective airbags 10 stable and uniform.

In this airbag device 1, although the substantially ribbon-shaped tethers 24 and 25 are provided in the airbag 10 to define the air chambers 21, 22, and 23, for example, a plurality of strip-shaped tethers may be arranged in the left-right direction G or may be disposed at predetermined intervals. Alternatively, the base fabric sheets 11 and 12 on both sides may be joined by sewing or the like to form such air chambers. Furthermore, depending on the shape, size, the required performance, the attachment position to the vehicle body, etc., the airbag 10 does not need to have any one or all of the tethers 24, 25, and 26.

Furthermore, although this embodiment has been described taking the airbag device 1 having the inflator 2 disposed in the airbag 10 as an example, the present invention may be applied to a knee-protecting airbag device having another configuration, for example, an airbag device having the inflator 2 disposed and fixed outside the airbag 10.

The invention claimed is:

1. A knee-protecting airbag device comprising: an airbag with a base end attached to and accommodated in a vehicle body in front of an occupant; and
    an inflator that supplies gas to the airbag, the knee-protecting airbag device inflating and deploying the airbag from the base end to a position between the vehicle body and the knees of the occupant with the gas from the inflator,
    wherein the airbag is folded and accommodated so as to have a folding-in portion formed by folding a leading end in the deploying direction into the airbag; a pair of first roll-folded portions formed by roll-folding left and right ends of the airbag, whose leading end has been folded-in, toward each other toward a surface on a vehicle-body side; and a second roll-folded portion formed by roll-folding the leading end of the airbag in the deploying direction, whose left and right ends have been roll-folded, toward the base end toward the surface on the vehicle-body side,
    wherein the pair of first roll-folded portions are formed at a distance from each other so that the left and right ends of the airbag do not come into contact with each other,
    wherein the airbag has a tether disposed therein extending in a direction intersecting the deploying direction, the tether defining the inside of the airbag into a plurality of air chambers,
    wherein the folding-in portion is formed by folding the leading end into one of said plurality of air chambers at an extreme leading end in the deploying direction; and
    wherein at least one tether has a plurality of through holes that allow gas to pass therethrough and reach the leading end.

2. The knee-protecting airbag device according to claim 1, wherein at least two tethers have a plurality of through holes that allows the gas from the inflator to circulate between the air chambers defined on both sides of the tethers.

3. The knee protecting airbag device according to claim 1, wherein a tether in closest proximity to the leading end comprises a plurality of tethers in a line.

4. The knee protecting airbag device according to claim 1, wherein the folding-in-portion of the leading end is folded inward and contacts a tether in closest proximity to the leading end.

* * * * *